April 19, 1966  R. SAYLOR  3,247,317
SATELLITE VISUAL SIMULATOR
Filed May 31, 1963  4 Sheets-Sheet 1

April 19, 1966  R. SAYLOR  3,247,317

SATELLITE VISUAL SIMULATOR

Filed May 31, 1963  4 Sheets-Sheet 2

April 19, 1966  R. SAYLOR  3,247,317
SATELLITE VISUAL SIMULATOR
Filed May 31, 1963  4 Sheets-Sheet 3
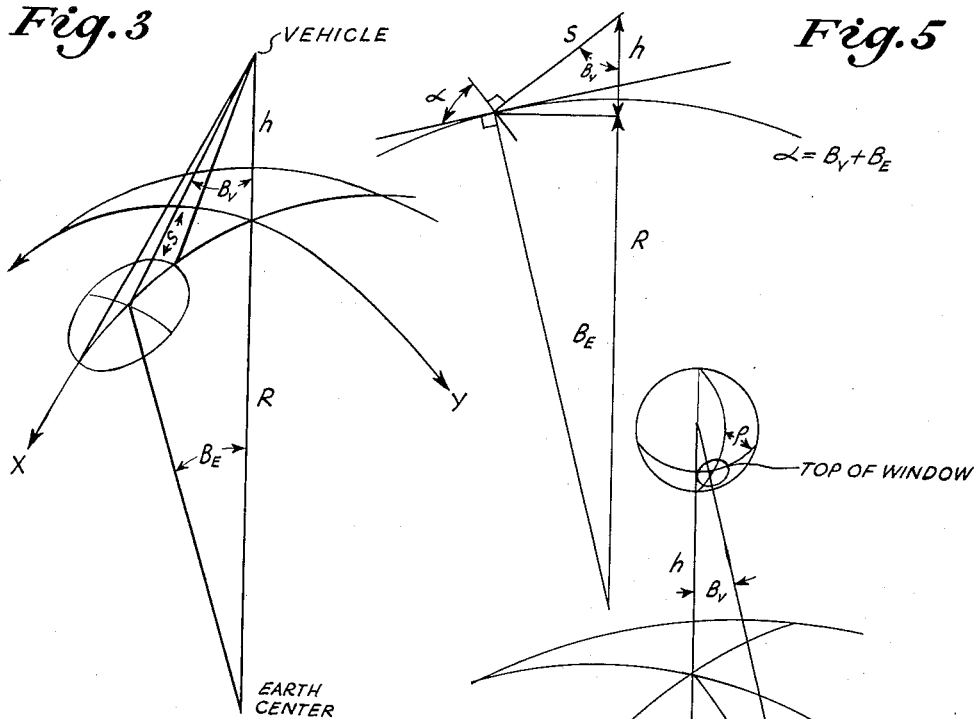
Fig.3
Fig.5
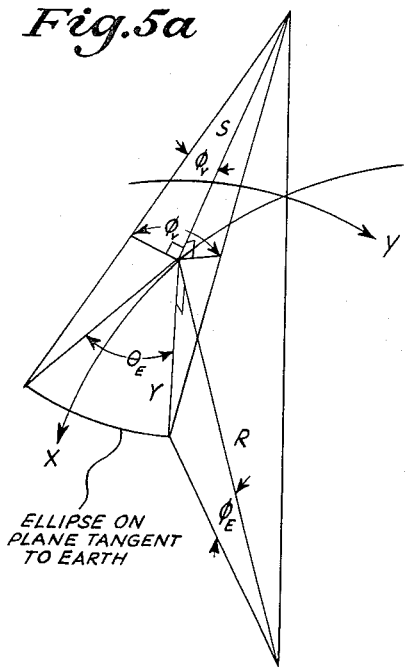
Fig.5a
Fig.3a

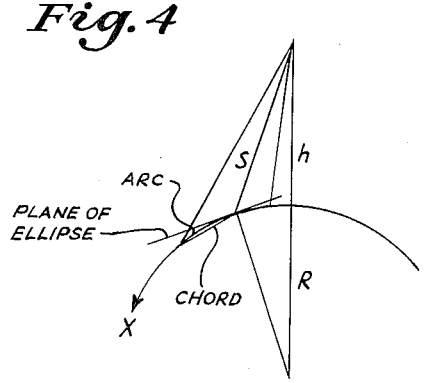
Fig. 4
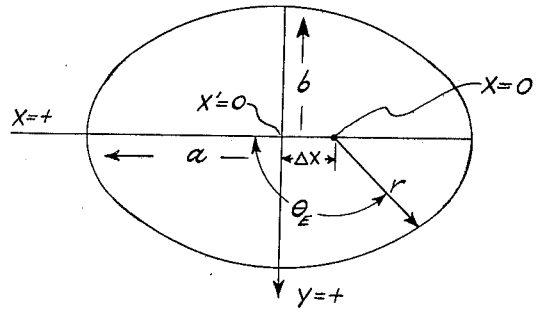
Fig. 6
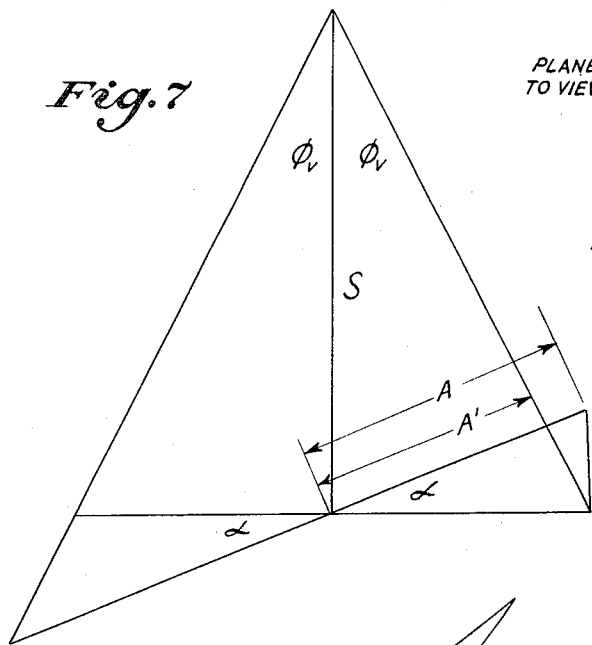
Fig. 7
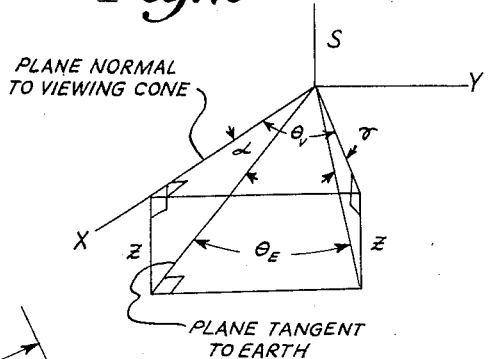
Fig. 10
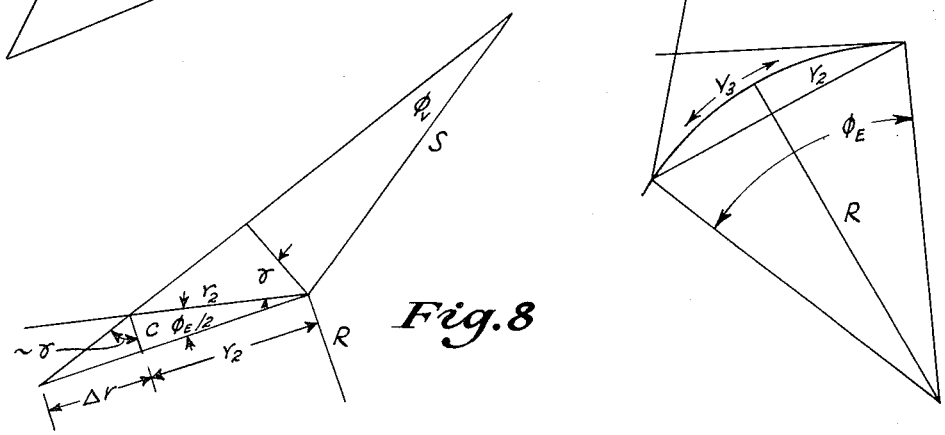
Fig. 8
Fig. 9

United States Patent Office 3,247,317
Patented Apr. 19, 1966

3,247,317
SATELLITE VISUAL SIMULATOR
Richard Saylor, Monsey, N.Y., assignor to Dalto
Electronics Corp., Norwood, N.J.
Filed May 31, 1963, Ser. No. 284,692
6 Claims. (Cl. 178—6.8)

This invention relates generally to the field of television projection systems, and more particularly to improved means in the form of a visual display system which simulates the view from the window of an orbiting earth satellite. This structure has particular application in the training of astronauts, but may be used in a wide variety of other applications as well.

It is among the principal objects of the present invention to present a simulated display in full color and true perspective, in which resolution, brightness, contrast range and freedom from distortion are equivalent to the best that can be obtained by closed circuit television techniques.

Another object of the invention lies in the provision of a circular screen visual display which will reproduce an image in perspective from a film strip which is a flat plane projection of the surface of the earth as might be seen from a satellite during one or more obits of the earth.

A further object of the invention lies in the provision of a television system employing a controlled amount of distortion incorporated into the scanned raster such that the plane projection image on the planar film transparency scanned by the raster is converted into a true perspective image by means of a co-ordinate computer which accepts vehicle attitude information and computes the point on the earth's surface which lies on the line of sight, and a sweep computer which generates sweep voltages for both scanning and display tubes.

A feature of the invention lies in the fact that it is readily adaptable to large screen projection, tri-color projection, or single black-and-white projection.

These objects and features, as well as other incidental ends and advantages, will more fully appear in the progress of the following disclosure, and be pointed out in the appended claims.

In the drawings, to which reference will be made in the specification:

Figure 1:
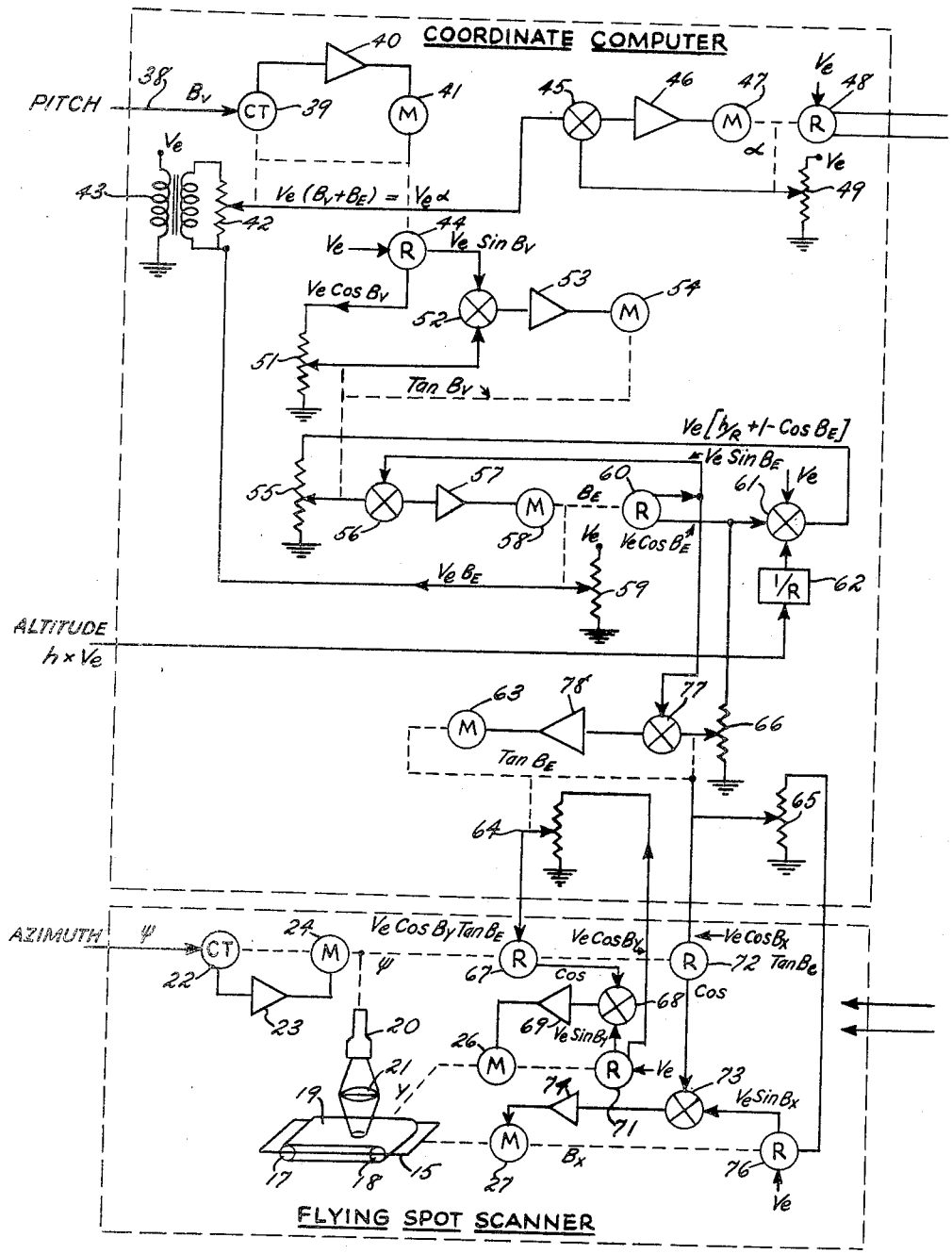
FIGURE 1 is a schematic diagram of a co-ordinate computer and flying spot scanner comprising parts of an embodiment of the invention.
Figure 2:
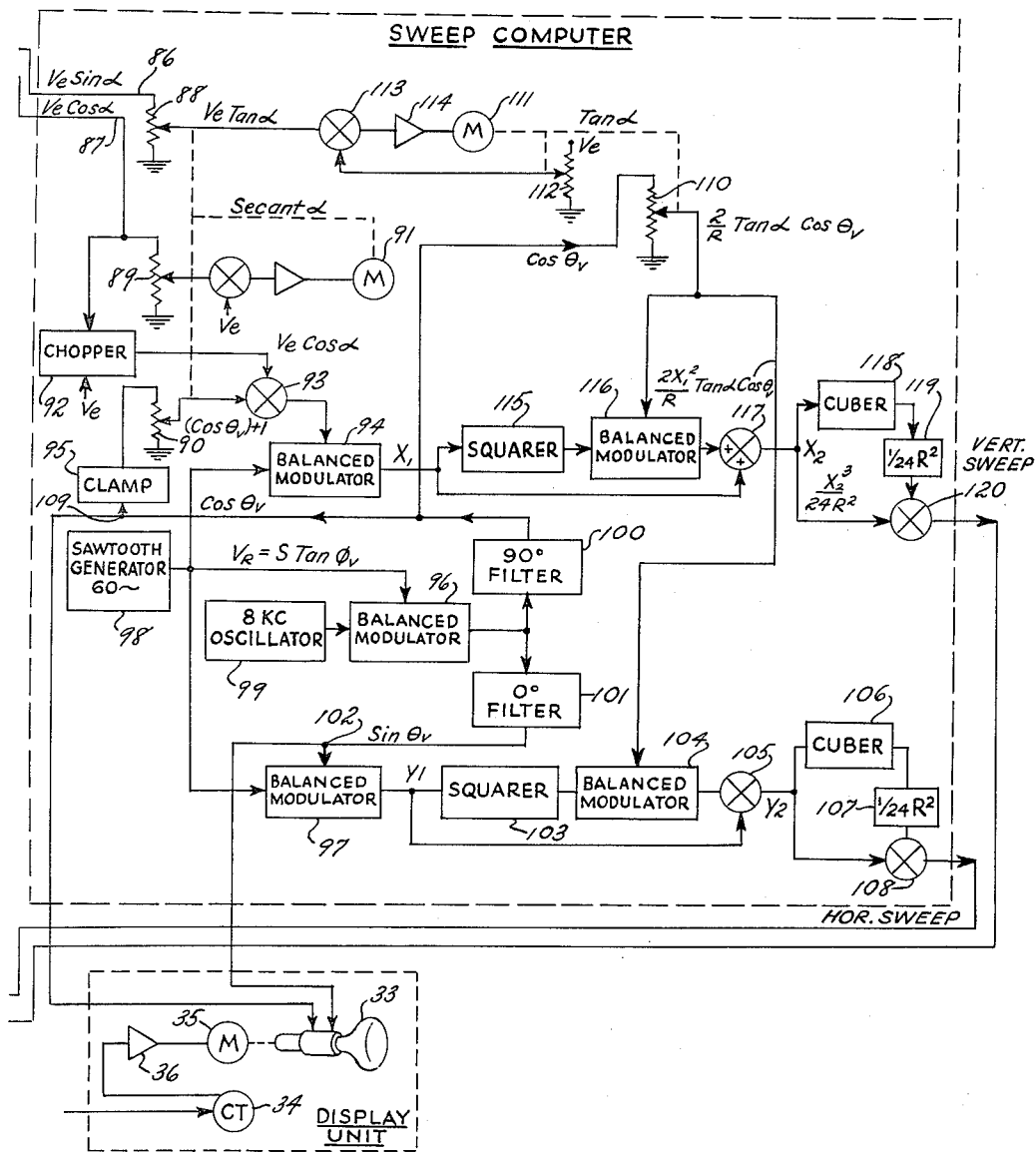
FIGURE 2 is a schematic wiring diagram of a sweep computer and display unit comprising certain other parts of the embodiment.

FIGURES 3–10, inclusive, are schematic representations employed in the derivation of formulae which are instrumented by the structure shown in FIGURES 1 and 2.

Before entering into a detailed description of the structural embodiment illustrated in FIGURES 1 and 2 in the drawings, a discussion of the theory involved in the operation of the device is essential.

The display is generated by means of a flying spot scanner in conjunction with a continuous film strip. The film strip is a flat plane projection of the surface of the earth as seen from a satellite during orbit. The strip is approximately five inches wide, representing a path 3,000 nautical miles wide, which is slightly more than the horizon-to-horizon distance at an altitude of approximately 300 miles. In the disclosed embodiment, the strip passes through the scanner assembly at a constant speed approximately .39 inch per minute representing a nominal 14,000-knot orbital velocity. If desired, this speed may be increased for problems in which greater than actual time may be used.

The scanning raster is projected onto that portion of the film representing the view from the satellite window. This view subtends an angle of approximately 30° with a circular cross section. The light passing through the transparency is broken into three spectrum components, namely red, green, and blue, by means of a pair of dichroic mirrors and illuminates a set of three photomultipliers. Three video signals are thus generated which are amplified and applied to a set of three color projection tubes, respectively. The resulting images are recombined by means of an optical system incorporating another set of dichroic mirrors and a projection lens, and are projected onto the rear of the viewing screen.

If the shape of the raster in the flying spot scanner tube were the same as the shape in the display tube, then no distortion of image would occur. If the raster shapes are different in any way, then the displayed image is distorted. In the present system, a controlled amount of distortion is incorporated in the scanner raster such that the plane projection image on the transparency is converted into a true perspective image of the surface of the earth. This is accomplished by means of a co-ordinate computer which simultaneously generates the sweep voltages for both the scanner and display tubes.

Referring to FIGURE 3 in the drawings, consider a satellite vehicle at an altitude $h$ above the earth, from which a line of sight makes an angle $B_v$ with the vertical. By the sine law: X (1) $$\frac{R}{\sin B_v} = \frac{R+h}{\sin (B_v+B_e)}$$

By substituting the expression for the sine of the sum of two angles and rearranging, an implicit solution for $B_v$ is found which can be used to solve for $B_e$ in a servo computer.

(2) $$R \sin B_e = \tan B_v [h - R(\cos B_e - 1)]$$

The plane P in which the line of sight is disposed makes an angle p.s.i. with the north-south axis of the earth where p.s.i. is the aximuth angle.

Referring p.s.i. to FIGURE 3, (3) $\tan B_x = \tan B_e \cos$ p.s.i.
$\tan B_y = \tan B_e \sin$ p.s.i.

The Equation 3 is used to solve for the $x$ and $y$ displacements of the transparency carriage necessary to align the point of sight with the vertical axis.

The display uses a spiral sweep, in which the vertical and horizontal sweep voltages are:

$$V_v = V_m \frac{t}{T} \sin w_s t = V_r \sin w_s t$$

$$V_h = V_m \frac{t}{T} \cos w_s t = V_r \cos w_s t$$

where $V_m$=maximum sweep voltage
$t$=time
$T$=period of one field
$w_s$=circular sweep frequency The scanner sweep is derived by projecting a cone of visibility on the earth. The cone represents one circular sweep of the display unit. The complete raster of the display unit forms a family of cones. The resulting family of intersections comprises the scanner raster. FIGURE 3 illustrates one cone of visibility and the resulting intersecting curve.

The intersecting curve is obtained by commensing with an ellipse which results from intersecting the cone of vision with a plane, the plane being tangent to the surface of the earth at the center of the cone as shown in FIGURE 5.

Once the ellipse has been derived, it is modified in steps until it represents the desired curve.

Referring to FIGURE 6, the basic ellipse is represented by the equation:

$$\frac{(x')^2}{a^2}+\frac{y^2}{b^2}=1$$

The constants are derived by taking a cross section through the X axis as shown in FIGURE 7.

As an approximation, let $$a=\frac{S \tan \phi_v}{\cos \alpha}$$

and $$b=S \tan \phi_v$$

$y$ will vary with the horizontal sweep of the display unit as follows:

$$y=S \sin \theta_v \tan \phi_v$$

Substituting into the ellipse equation for $a$, $b$, and $y$:

$$(x')^2=a^2-\frac{y^2 a^2}{b^2}\left(\frac{S \tan \phi}{\cos \alpha}\right)^2\left[1-\left(\frac{S \sin \theta_v \tan \phi_v}{S \tan \phi_v^2}\right)^2\right]$$

or $$x'=\frac{S \tan \phi_v \cos \theta_v}{\cos \alpha}$$

Referring to FIGURES 4 and 5, it will be obvious that the ellipse is not centered at $x=0$, because of the angle at which the line of sight strikes the surface of the earth, and the difference between $x=0$ and $x'=0$ is obtained from a consideration of FIGURE 5 wherein:

$$\Delta x = x - x' \cong A - A' = S \tan \phi_v \left(\frac{1}{\cos \alpha} - \cos \alpha \right)$$

$$X = x' + \Delta x \cong S \tan \phi_v \left[\frac{(\cos \theta_v)+1}{\cos \alpha} - \cos \alpha \right]$$

The above step has computed the ellipse offset to align the center of the ellipse with the line of sight. The next step is to compute the chord correction. This correction essentially moves the tangent plane toward the center of the earth a distance sufficient to make it intersect the instantaneous scan line.

Referring to FIGURE 8, using small angle approximations for $\psi_v$ and $\psi_e$, the correction factor to be added to the radius of the ellipse is:

$$\Delta r = \frac{2r^2}{R} \tan \gamma$$

where $\gamma$ is found from FIGURE 6 to be:

$$\tan \gamma = \tan \alpha \cos \theta_v$$

Substituting: $\Delta r = 2r^2 \tan \alpha \cos \theta_v$ and $$\frac{r+\Delta r}{r}=\left(1+\frac{2r}{R} \tan \alpha \cos \theta_v \right)$$

Thus, the radius must be increased by the above factor by multiplying the $x$ and $y$ coordinates by the factor. The $x$ or $y$ variable must then be substituted for "$r$" in the equation.

The next step is to compute the curvature correction. This correction accounts for the difference between the chord length and the length of the great circle line which the chord subtends. Thus, to provide spherical curvature, the chord distance must be replaced by the equivalent arc distance. FIGURE 9 shows the relationship between the two. The ratio is:

$$\frac{r_3}{r_2}=\frac{R\phi_e}{2R \sin\frac{1}{2}\phi_e}=\frac{\phi_e}{2 \sin\frac{1}{2}\phi_e}$$

Using small angle approximations for $\phi_e$:

$$\frac{r_3}{r_2}=\frac{1}{1-\frac{\phi_e^2}{24}}\cong 1+\frac{\phi_e^2}{24}\cong 1+\frac{r_2^2}{24R^2}$$

This correction factor must be applied to both $x$ and $y$.

*Final equations for scanner deflection*

Applying the correction terms to the ellipse equations yields the following:

$$x_1=S \tan \phi_v\left[\frac{(\cos \theta_v)+1}{\cos \alpha}-\cos \alpha\right] \text{ (Ellipses with offset)}$$

$$x_2=x_1\left(1+\frac{2x_1}{R}\tan \alpha \cos \theta_v\right) \text{ (Chord factor)}$$

$$x_3=x_2\left(1+\frac{x_2^2}{24R^2}\right) \text{ (Curvature correction)}$$

Or in the form of a single equation:

$$x = S \tan \phi_v \left[\frac{(\cos \theta_v)+1}{\cos \alpha}-\cos \alpha\right] +$$
$$\frac{2S^2}{R}\tan^2 \phi_v \left[\frac{(\cos \theta_v)+1}{\cos \alpha}-\cos \alpha\right]^2$$
$$\tan \alpha \cos \theta_v + \frac{S^3}{24R^2}\tan^3 \phi_v \left[\frac{(\cos \theta_v)+1}{\cos \alpha}-\cos \alpha\right]^3$$

For $y$:

$$y_1=S \sin \theta_v \tan \phi_v \text{ (Ellipse)}$$

$$y_2=y_1\left(1+\frac{2y_1}{R}\tan \alpha \cos \theta_v\right) \text{ (Chord Factor)}$$

$$y_3=y_2\left(1+\frac{y_2^2}{24R^2}\right) \text{ (Curvature correction)}$$

As a single equation:

$$y=S \tan \phi_v \sin \theta_v + \frac{2S^2}{R}\sin^2 \theta_v \tan^2 \phi_v \tan \alpha \cos \theta_v +$$
$$\frac{S^3}{24R^2}\sin^3 \theta_v \tan^3 \phi_v$$

Referring again to FIGURE 3, to obtain coordinate computation for spherical perspective, vehicle pitch ($\beta_v$), roll ($\rho$), azimuth ($\psi$), and altitude ($h$) are obtained from a parent simulator. R is the radius of the earth, a known constant.

The information which must be computed is as follows:

$\beta_e$
$x=R\beta_x$
$y=R\beta_y$
secant $\alpha$
cosine $\alpha$ } See FIGURE 5 for definition of $\alpha$
tangent $\alpha$ From FIGURE 5, $$\tan \beta_v[h+R(1-\cos \beta_e)]=R \sin \beta_e$$

which is an implicit solution of $\beta_e$.
(From Equation 3):

$$\tan \beta_x = \tan \beta_e \cos \psi$$

$$\tan \beta_y = \tan \beta_e \sin \psi$$

which are implicit solutions of $\beta_x$ and $\beta_y$.
From FIGURE 5, $$\alpha = \beta_v + \beta_e$$

*Instrumentation*

With the foregoing discussion of theory, reference may be made to FIGURES 1 and 2 in the drawings, which schematically illustrate an embodiment of the invention. The device comprises broadly: a flying spot scanner 10, a display unit 11, a coordinate computer 12, and a sweep computer 13.

The flying spot scanner 10 includes a film support element 15, incorporating driving means (not shown) for imparting motion to one of the first and second pulleys 17 and 18 about which a continuous film transparency is supported, the transparency bearing a representation of the earth's surface for the area involved, as previously described. The scanner tube 20 is provided with a lens 21 which casts an image on the screen of the tube. Azimuth adjustment is obtained by feeding information (angle $\psi$) to a control transformer 22, which through amplifier 23 operates a motor 24, the motor 24 rotating the tube to the proper angle. Motors 26 and 27 axially shift the film support element 15 in either of two mutually perpendicular directions, which may be designated as $x$ and $y$, the controlling signals driving motors 26 and 27 being received by components to be subsequently described.

The display unit 11 includes a display tube 33, including the color resolving components described hereinabove, the details of which form no part of the present disclosure. Roll components ($\rho$) of information are introduced through a control transformer 34, which operates a motor 35 through an amplifier 36.

The coordinate computer 12 determines the coordinates of the elliptical area swept by the flying spot scanner, in accordance with the theory above described, and includes a pitch input 38 which transmits signals to a control transformer 39, and an amplifier 40, to a motor 41. The motor 41 drives a potentiometer 42 which receives an inductively coupled voltage from a transformer 43, the transformer 43 being supplied with the voltage ($V_e$). The motor 41 also drives resolver 44, which feeds voltage ($V_e \cos \beta_v$) to a potentiometer 51 and a mixer 52. The voltage from the potentiometer 42 is also transmitted to a mixer 45 and an amplifier 46 to a motor 47 which drives a resolver 48 and a potentiometer 49. The voltage from the resolver 44 is mixed with the voltage from the potentiometer 51 and fed to an amplifier 53 which drives a motor 54, the motor 54 driving the potentiometer 51 and a potentiometer 55. The voltage from the potentiometer 55 is fed through a mixer 56 to an amplifier 57 to drive a motor 58 which in turn drives a potentiometer 59 and a resolver 60. Part of the output of the resolver 60 is fed to a mixer 61 which also receives voltage ($V_e$) and information relating to altitude ($h$) times ($V_e$) through a voltage divider $$\left(\frac{1}{R}\right)$$

62. The output of mixer 61 is fed to the resistance winding of the potentiometer 55.

A motor 63 drives a potentiometer 64 to produce a voltage varying with ($\tan \beta_e$) and potentiometers 65 and 66, the output of the latter being fed to a mixer 77 and amplifier 78 to the motor 63. The mixer 77 also receives a voltage from the resolver 60 corresponding to ($V_e \sin \beta_e$).

The output of potentiometer 64 is fed to a resolver 67, in turn feeding to a mixer 68 which mixes a signal from a resolver 71 to an amplifier 69 to the motor 26 wherein the transverse component of adjustability of the element 15 is obtained. The resolver 71 also supplies a voltage to the resistance winding of potentiometer 64, and is driven by the motor 26. Resolver 72 is also driven by the motor 24, and supplies a voltage from potentiometer 65 to a mixer 73 feeding an amplifier 74 to the motor 27 whereby longitudinal adjustment of the element 15 is obtained. Resolver 76 is driven by motor 27, and supplies the voltage ($V_e \sin_x$) to the mixer 73, and the voltage to the winding of the potentiometer 65.

The sweep computer 13 determines the sweep voltages to shape the elliptical area scanned by the flying spot scanner and its reproduction on the display unit. It includes first and second voltage inputs 86 and 87 corresponding to ($V_e \sin \alpha$) and ($V_e \cos \alpha$), respectively. Input 86 provides the resistance winding voltage for potentiometer 88, while input 87 provides a corresponding voltage for potentiometer 89. The potentiometers 88 and 89 are driven by a common motor 91 which also drives a potentiometer 90. Voltage from input 87 is also fed through a chopper 92 which also receives voltage ($V_e$), the output of the chopper 92 being fed to a mixer 93 which receives in addition voltage from the potentiometer 90. This output is fed to a balanced modulator 94 receiving the output of a sawtooth 60 cycle generator 98. A clamp 95 provides voltage to the potentiometer 90 in such a manner as to prevent the voltage from reversing polarity. Second and third balanced modulators 96 and 97 also operate on 60 cycle sawtooth inputs from the generator 98, the modulator 96 receiving an 8 kc. oscillation from an oscillator 99 is divided between a 90° filter 100 and a 0° filter 101, the former providing a voltage (cos $\theta_v$) to the tube 33 and to the resistance of the potentiometer 110 and the clamp 95. The 0° filter 101 provides the corresponding voltage (sin $\theta_v$) to the connection 102 wherein it is fed to the balanced modulator 97, the output of which is fed to a squarer 103 and a balanced modulator 104 where it mixes the output of a mixer 117 to be subsequently described and feeds it to a mixer 105 where it mixes with the voltage ($y_1$) received directly from the modulator 97. This voltage output is $y_2$, and is fed to a cuber 106 through a voltage divider 107

$$\left(\frac{1}{24R^2}\right)$$

which is mixed with $y_2$ in a mixer 108, the output of which constitutes the horizontal sweep voltage which is fed back to the flying spot scanner.

The potentiometer 110 is driven by motor 111 which also drives potentiometer 112, the motor 111 being driven by the output voltage of potentiometer 112 mixed with voltage ($V_e \tan \alpha$) from the potentiometer 88 in a mixer 113, the output of 113 being fed through an amplifier 114.

The output of modulator 94 which is voltage ($x_1$) is fed through a squarer 115, and a balance modulator 116 where it modulates the voltage from the potentiometer 110 which is voltage $$\left(\frac{2}{R} \tan \alpha \cos \theta_v\right)$$

the result being the voltage $$\left(\frac{2x_1^2}{R} \tan \alpha \cos \theta_v\right)$$

this voltage being mixed with the voltage ($x_1$) in the above mentioned mixer 117. This voltage which is ($x_2$) is in turn fed through a cuber 118 then through a voltage divider 119

$$\left(\frac{1}{24R^2}\right)$$

The resultant voltage $$\left(\frac{x_2}{24R^2}\right)$$

is fed to mixer 120 where it is combined with voltage $x_2$, and the output constitutes the vertical sweep voltage which is fed to the flying spot scanner.

I wish it to be understood that I do not consider the invention limited to the precise details of structure shown and set forth in this specification for obvious modifications will occur to those skilled in the art to which the invention pertains.

I claim:
1. In a system for generating a perspective image of a portion of a spherical surface as viewed from an instantaneously fixed point at a known elevation above said surface, said system comprising a film transparency having therein a flat plane projection of said spherical surface, a scanning means for scanning said film transparency with a light spot in a succession of sweeps of said light spot, and a display means for generating a display in a succession of sweeps synchronized with sweeps of said scanning means, the improvement comprising; means for continuously advancing said transparency beneath said scanning means at uniform speed, means for shifting said transparency in controlled amounts along two mutually perpendicular axes with respect to said scanning means, means for directing said scanning means in an elliptically shaped area having major and minor coordinates upon said transparency, and coordinate computer means for shaping said electrically shaped area to introduce controlled distortion to the image generated by said display.

2. In a system for generating a perspective image of a portion of a spherical surface as viewed from an instantaneously fixed point at a known elevation above said surface, said system comprising a film transparency having therein a flat plane projection of said spherical surface, a scanning means for scanning said film transparency with a light spot in a succession of sweeps of said light spot, and a display means for generating a display in a succession of sweeps synchronized with sweeps of said scanning means, the improvement comprising; means for shifting said transparency in controlled amounts along two mutually perpendicular axes with respect to said scanning means, means for directing said scanning means in an elliptically shaped area having major and minor coordinates upon said transparency, and coordinate computer means for shaping said electrically shaped area to introduce controlled distortion to the image generated by said display.

3. A system for generating a perspective image of a portion of the surface of the earth as viewed from an instantaneously fixed point in space at a known elevation above the earth, said system comprising a film transparency having thereon a flat plane projection of a portion of said surface of the earth, a scanning means for scanning said transparency with a light spot in a succession of sweeps of said light spot, display means synchronized with said scanning means, means for shifting said transparency in controlled amounts, along two mutually perpendicular directions, means for shaping the area scanned by said scanning means to an elliptically shaped area having major and minor axes, and for computing said major and minor axes to introduce controlled distortions to said image as reproduced upon a circular area of said display corresponding to said elliptical area scanned by said scanning means.

4. A system for generating a perspective image of a portion of the surface of the earth as viewed from an instantaneously fixed point in space at a known elevation above the earth, said system comprising a film transparency having thereon a flat plane projection of a portion of said surface of the earth, a scanning means for scanning said transparency with a light spot in a succession of sweeps of said light spot, display means synchronized with said scanning means, means for shifting said transparency in controlled amounts, along two mutually perpendicular directions, means for shaping the area scanned by said scanning means to an elliptically shaped area having major and minor axes, and for computing said major and minor axes to introduce controlled distortions to said image as reproduced upon a circular area of said display corresponding to said elliptical area scanned by said scanning means; and means for continuously advancing said transparency past said scanning means.

5. A system for generating a perspective image of a portion of the surface of the earth as viewed from an instantaneously fixed point in space at a known elevation above the earth, said system comprising a film transparency having thereon a flat plane projection of a portion of said surface of the earth, a scanning means for scanning said transparency with a light spot in a succession of sweeps of said light spot, display means synchronized with said scanning means, means for shifting said transparency in controlled amounts, along two mutually perpendicular directions, means for shaping the area scanned by said scanning means to an elliptically shaped area having major and minor axes, and for computing said major and minor axes to introduce controlled distortions to said image as reproduced upon a circular area of said display corresponding to said elliptical area scanned by said scanning means; and means for continuously advancing said transparency past said scanning means at uniform speed.

6. A system for generating a perspective image of a portion of the surface of the earth as viewed from an instantaneously fixed point in space at a known elevation above the earth, said system comprising a film transparency having thereon a flat plane projection of a portion of said surface of the earth, a scanning means for scanning said transparency with a light spot in a succession of sweeps of said light spot, display means synchronized with said scanning means, means for shifting said transparency in controlled amounts, along two mutually perpendicular directions, means for shaping the area scanned by said scanning means to an elliptically shaped area having major and minor axes, and for computing said major and minor axes to introduce controlled distortions to said image as reproduced upon a circular area of said display corresponding to said elliptical area scanned by said scanning means; said transparency being in the form of a continuous loop of film and means for continuously advancing said transparency past said scanning means at uniform speeds.

No references cited.

DAVID G. REDINBAUGH, *Primary Examiner.*